US011185210B2

(12) United States Patent
Lee et al.

(10) Patent No.: US 11,185,210 B2
(45) Date of Patent: *Nov. 30, 2021

(54) PUMP AND DISHWASHER INCLUDING THE SAME

(71) Applicant: LG ELECTRONICS INC., Seoul (KR)

(72) Inventors: Sangsoo Lee, Seoul (KR); Myoungjong Kim, Seoul (KR); Jongmin Lee, Seoul (KR); Yongjin Choi, Seoul (KR); Minchul Kim, Seoul (KR); Jinseok Park, Seoul (KR); Soohan Eo, Seoul (KR); Semin Jang, Seoul (KR); Seongwoo An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

This patent is subject to a terminal disclaimer.

(21) Appl. No.: 16/825,558

(22) Filed: Mar. 20, 2020

(65) Prior Publication Data
US 2020/0214531 A1 Jul. 9, 2020

Related U.S. Application Data

(60) Division of application No. 16/449,887, filed on Jun. 24, 2019, now Pat. No. 10,653,290, which is a
(Continued)

(30) Foreign Application Priority Data

Aug. 22, 2014 (KR) .......................... 10-2014-0109476
Jul. 20, 2015 (KR) .......................... 10-2015-0102315
Jul. 20, 2015 (KR) .......................... 10-2015-0102316

(51) Int. Cl.
*A47L 15/42* (2006.01)
*F04D 29/42* (2006.01)
(Continued)

(52) U.S. Cl.
CPC ............... *A47L 15/42* (2013.01); *A47L 15/00* (2013.01); *A47L 15/08* (2013.01);
(Continued)

(58) Field of Classification Search
CPC ........................................................ A47L 15/42
See application file for complete search history.

(56) References Cited

U.S. PATENT DOCUMENTS

2004/0103929 A1   6/2004  Ha
2008/0011335 A1   1/2008  Kim et al.
(Continued)

FOREIGN PATENT DOCUMENTS

CN         1187982 A     7/1998
CN       101103894 A     1/2008
(Continued)

OTHER PUBLICATIONS

U.S. Appl. No. 16/449,887, filed Jun. 24, 2019.
(Continued)

*Primary Examiner* — Jason Y Ko
(74) *Attorney, Agent, or Firm* — Dentons US LLP

(57) ABSTRACT

A pump (8) is disclosed. The pump (8) includes a partition wall (84) configured to divide the interior of a body into two spaces, a first chamber (C1) located under the partition wall (84), the first chamber (C1) having an introduction portion (841), through which water is introduced, a second chamber (C2) located above the partition wall (84), the second chamber (C2) having a discharge portion (849), through which water is discharged, a communication hole (86) formed through the partition wall (84) to allow the first chamber (C1) and the second chamber (C2) to communicate with each other therethrough, an impeller (85) provided in the second chamber (C2) to move water to the discharge portion (849), a housing configured to define the bottom
(Continued)

surface of the first chamber (C1), the housing being made of a conductor, a heater (H) configured to heat the housing (81), and a steam discharge (843) port formed through the first chamber (C1) to allow steam to be discharged therethrough.

14 Claims, 11 Drawing Sheets

Related U.S. Application Data division of application No. 16/059,582, filed on Aug. 9, 2018, now Pat. No. 10,368,715, which is a continuation of application No. 15/314,864, filed as application No. PCT/KR2015/008586 on Aug. 18, 2015, now Pat. No. 10,092,161.

(51) Int. Cl.
*F04D 29/58* (2006.01)
*A47L 15/00* (2006.01)
*A47L 15/08* (2006.01)
*F04D 13/00* (2006.01)

(52) U.S. Cl.
CPC ....... *A47L 15/4225* (2013.01); *A47L 15/4234* (2013.01); *F04D 13/00* (2013.01); *F04D 29/4273* (2013.01); *F04D 29/4293* (2013.01); *F04D 29/586* (2013.01)

(56) References Cited

U.S. PATENT DOCUMENTS

2009/0235957 A1 9/2009 Kim
2012/0279527 A1 11/2012 Lee et al.

FOREIGN PATENT DOCUMENTS

| | | |
|---|---|---|
| CN | 101336821 A | 1/2009 |
| CN | 102355843 A | 2/2012 |
| CN | 103799936 A | 5/2014 |
| CN | 203662705 U | 6/2014 |
| DE | 19844898 A1 | 4/2000 |
| DE | 102008061084 A1 | 7/2009 |
| EP | 2221485 A2 | 8/2010 |
| EP | 2510864 A1 | 10/2012 |
| JP | 50-101203 U | 8/1975 |
| JP | 11-262465 A | 9/1999 |
| JP | 2005-146970 A | 6/2005 |
| JP | 2005-296546 A | 10/2005 |
| KR | 10-2006-0027096 A | 3/2006 |
| KR | 10-2006-0124285 A | 12/2006 |
| KR | 10-2012-0022430 A | 3/2012 |
| KR | 10-2013-0070275 A | 6/2013 |
| WO | 2006031060 A1 | 3/2006 |

OTHER PUBLICATIONS

U.S. Appl. No. 16/059,582, now U.S. Pat. No. 10,368,715.
U.S. Appl. No. 15/314,864, now U.S. Pat. No. 10,092,161.
U.S. Appl. No. 16/449,887, now U.S. Pat. No. 10,653,290.

[Fig. 4]
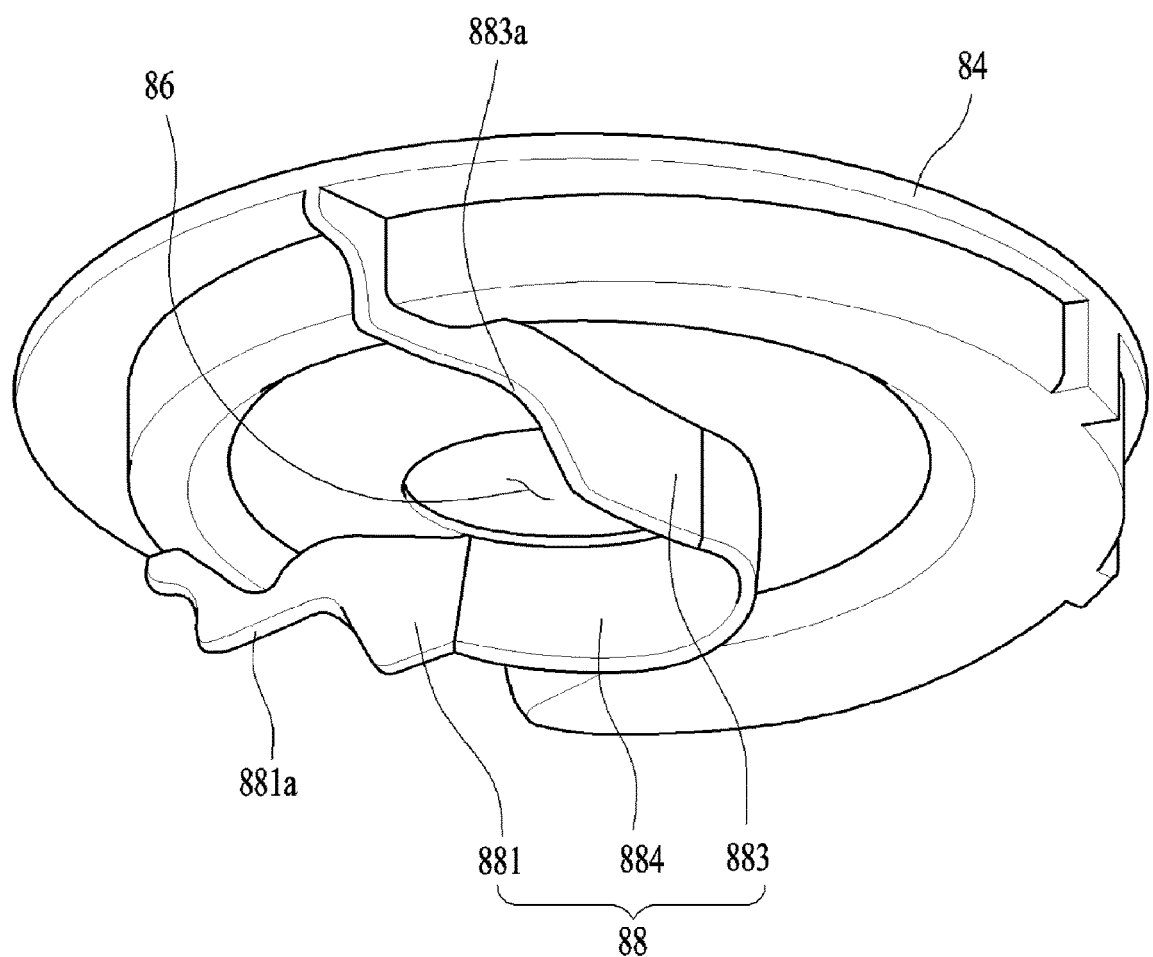

[Fig. 5]
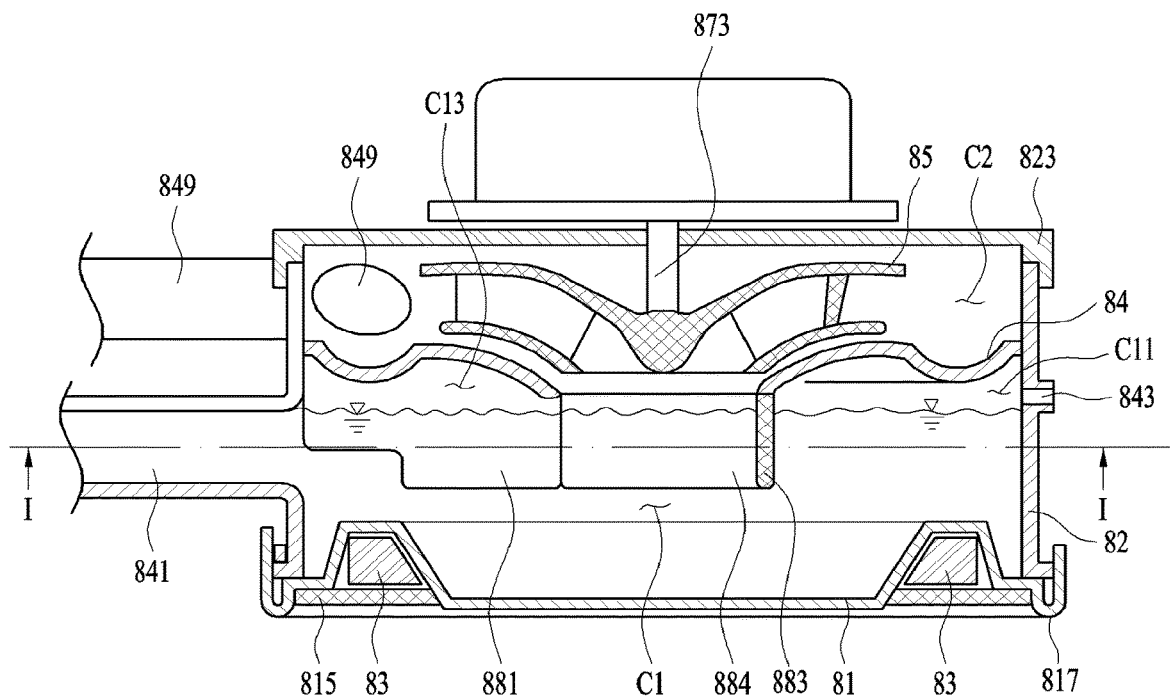

[Fig. 6]
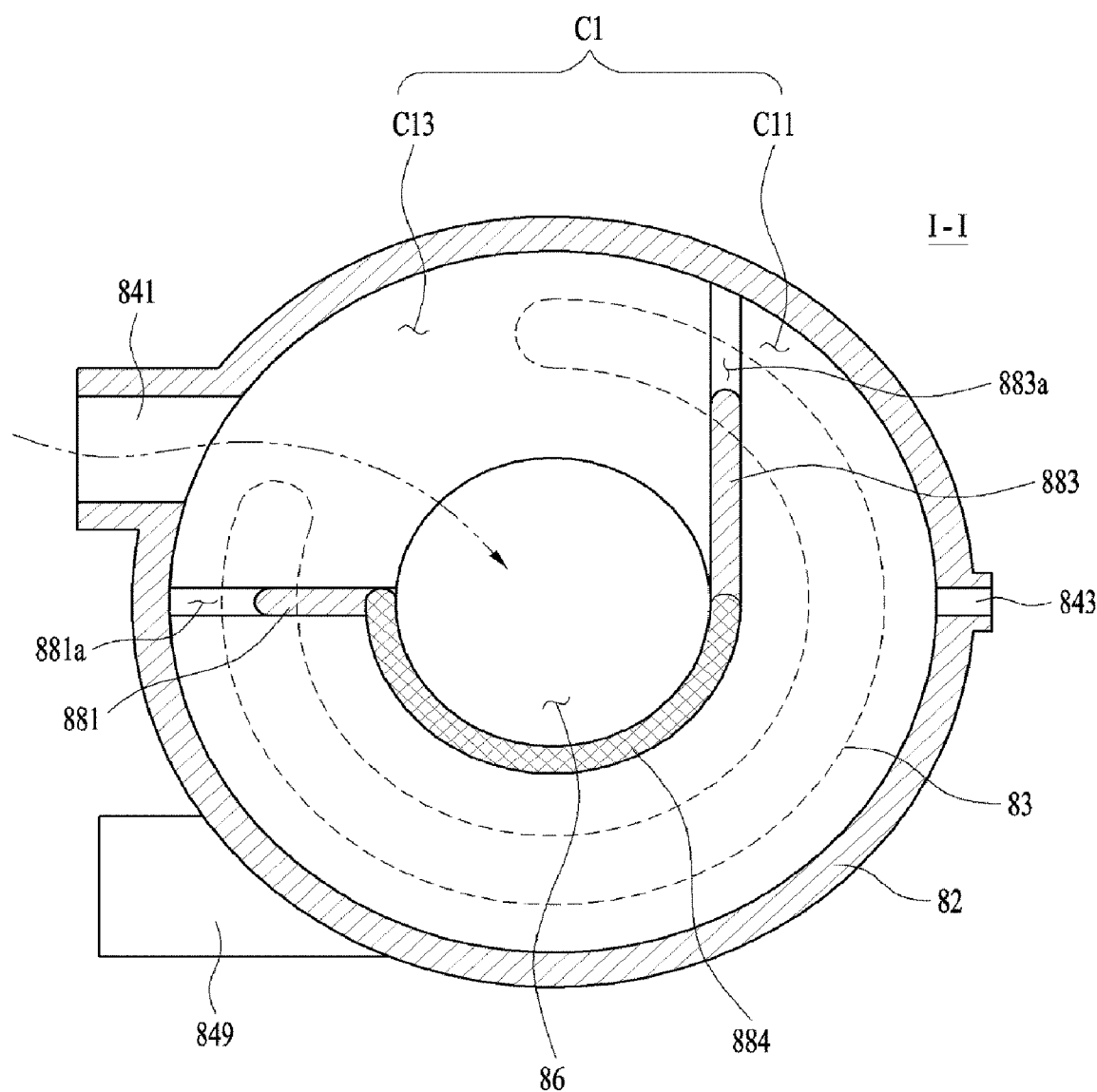

[Fig. 7]
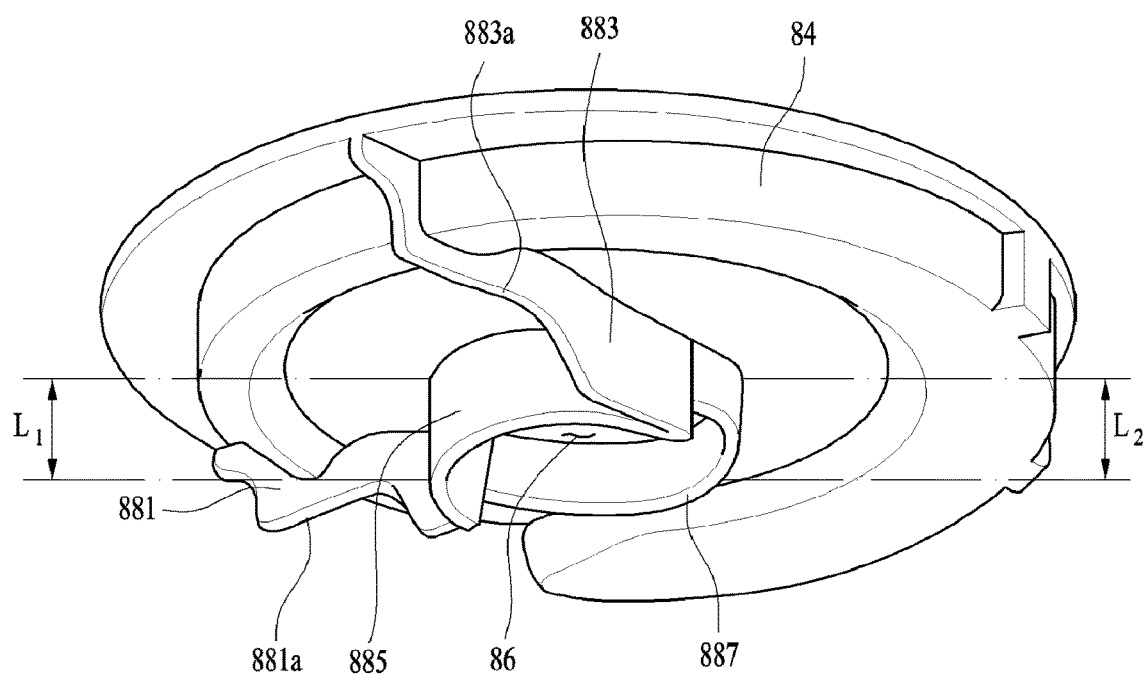

[Fig. 8]
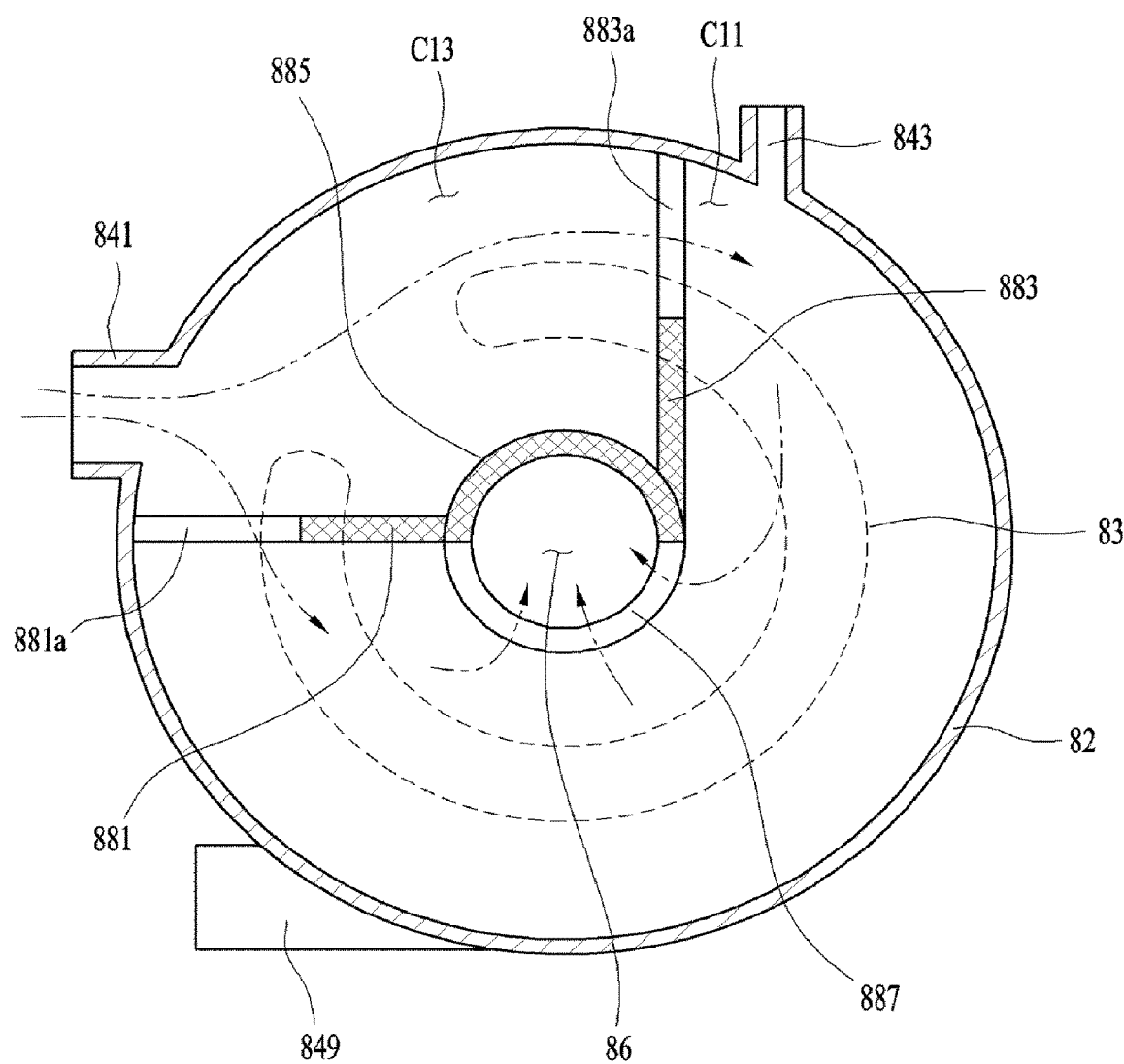

[Fig. 9]
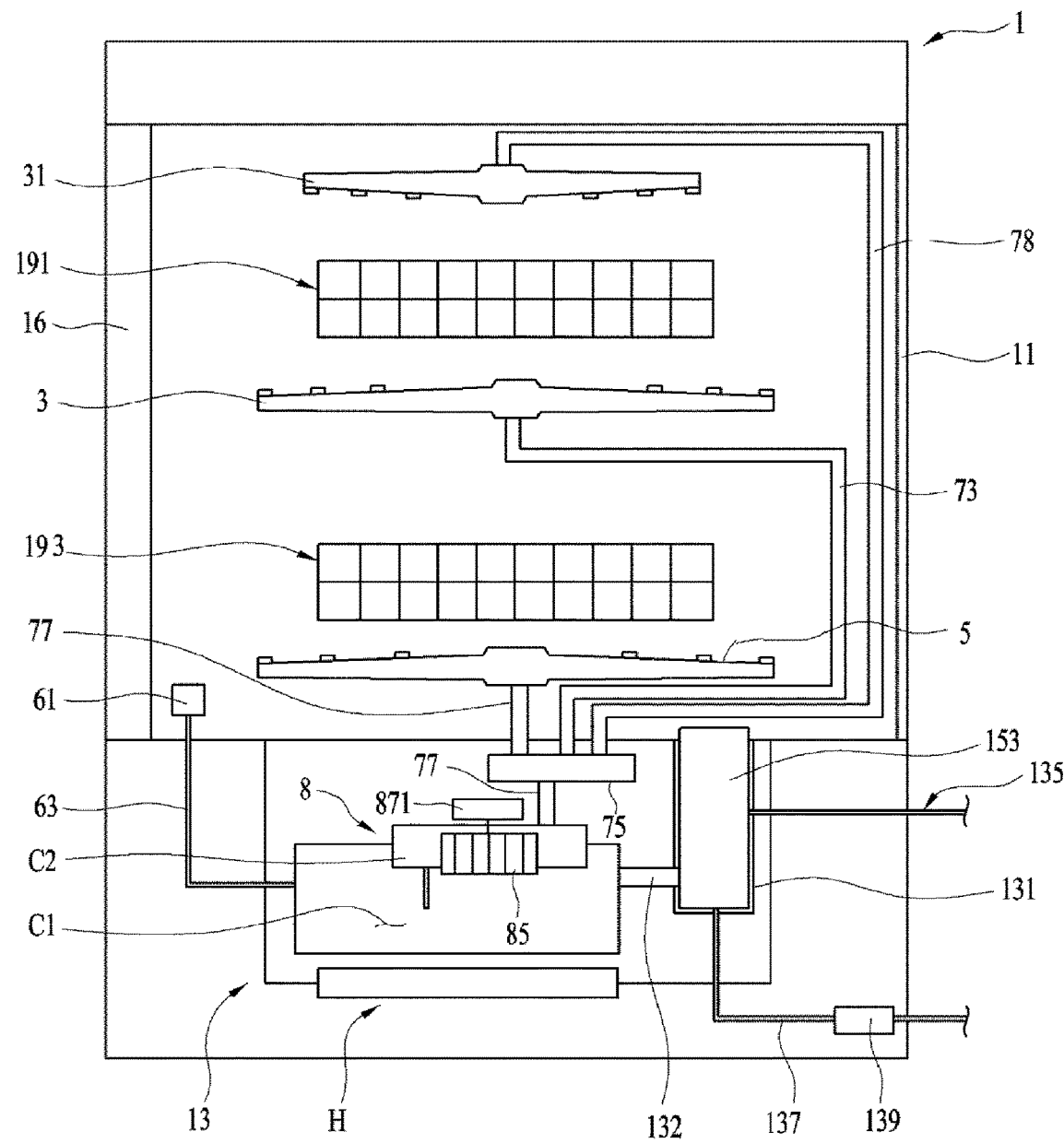

[Fig. 10]
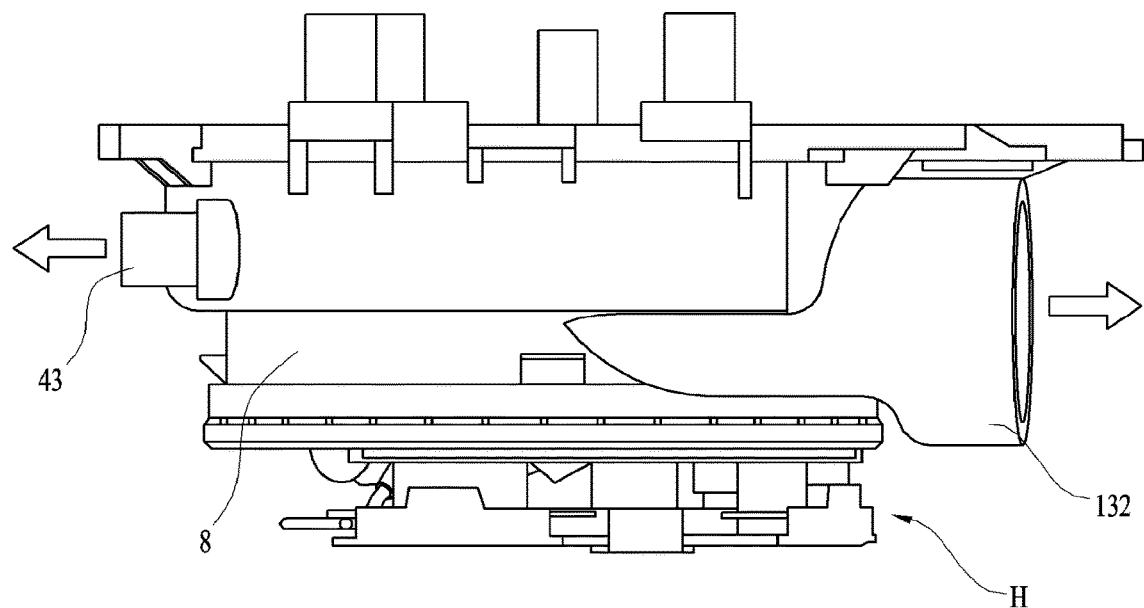
[Fig. 11]
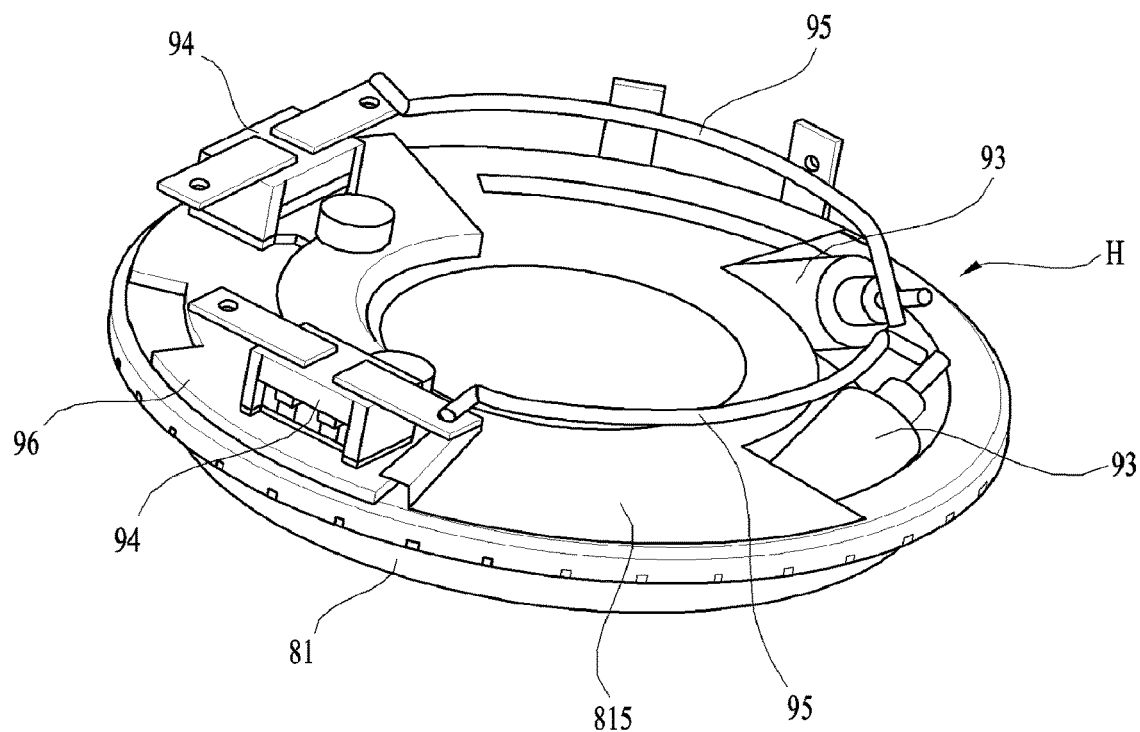

[Fig. 12]
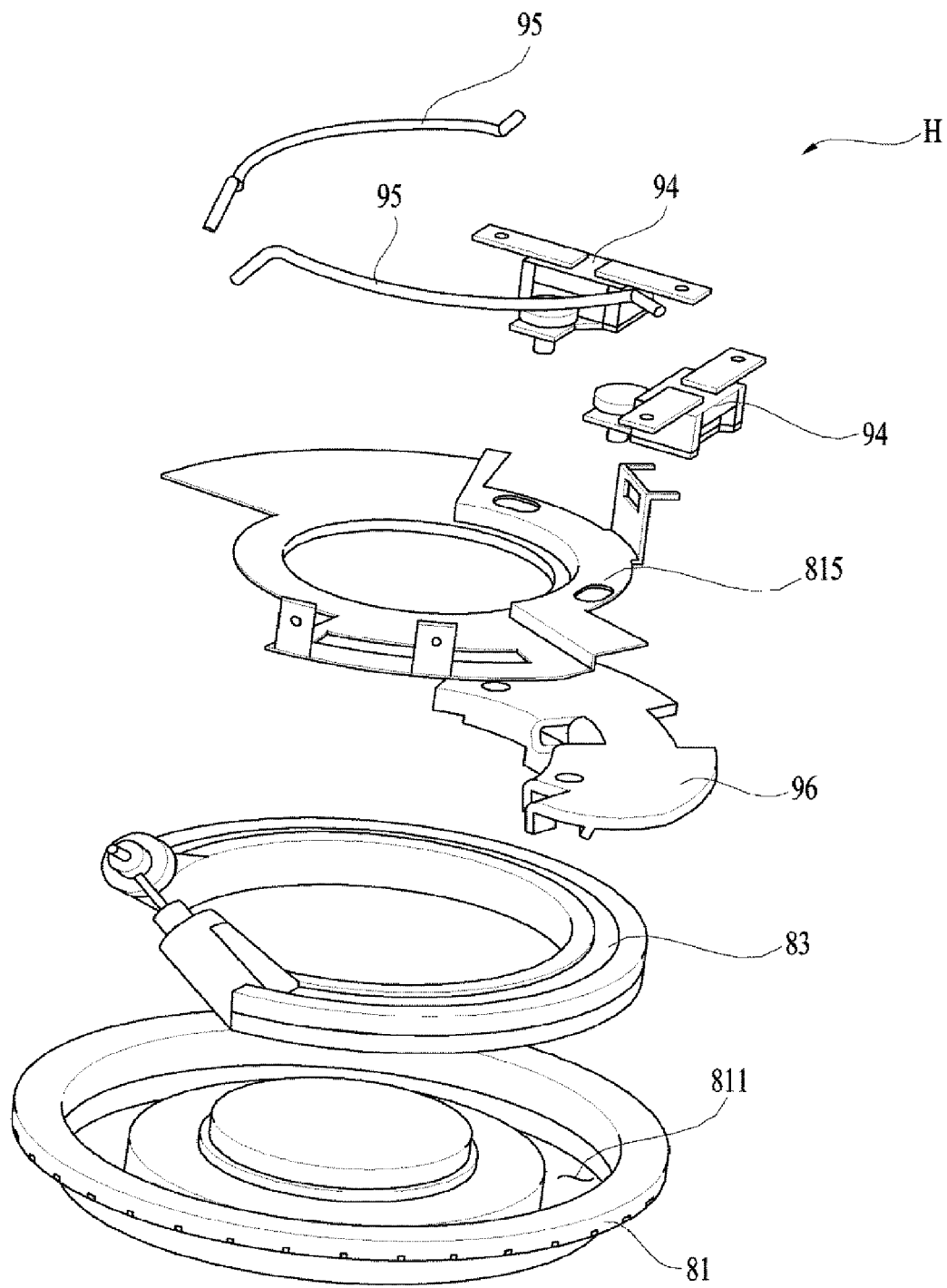

PUMP AND DISHWASHER INCLUDING THE SAME

This application is a Divisional of application Ser. No. 16/449,887, filed on Jun. 24, 2019, which is a Divisional of application Ser. No. 16/059,582, issued as U.S. Pat. No. 10,368,715, which is a continuation of application Ser. No. 15/314,864, issued as U.S. Pat. No. 10,092,161, which is a National Stage Application of International Application No. PCT/KR2015/008586, filed on Aug. 18, 2015, which claims the benefit of Korean Patent Application No. 10-2014-0109476, filed on Aug. 22, 2014, Korean Patent Application No. 10-2015-0102315, filed on Jul. 20, 2015 and Korean Patent Application No. 10-2015-0102316, filed on Jul. 20, 2015, all of which are hereby incorporated by reference in their entirety for all purposes as if fully set forth herein.

TECHNICAL FIELD

The present invention relates to a pump and a dishwasher including the same.

BACKGROUND ART

A dishwasher is an electric home appliance machine that sprays wash water onto objects to be washed in order to remove foreign matter from the objects.

A conventional dishwasher generally includes a tub that defines a washing space, a rack provided in the tub to receive objects to be washed, a spray arm configured to spray wash water to the rack, a sump configured to store wash water, and a pump configured to supply the wash water stored in the sump to the spray arm.

Meanwhile, some examples of the conventional dishwasher are configured to wash objects to be washed using heated wash water (hot water) or to supply steam to objects to be washed in order to wash or sterilize the objects.

In general, a dishwasher using hot water is configured to heat wash water stored in a sump using a heater provided in the sump in order to generate hot water.

In this case, the heater is exposed in the sump with the result that the heater contacts wash water. For this reason, in the conventional dishwasher, it is necessary to control the water level in the sump such that the heater is not exposed in order to prevent the heater from overheating.

In addition, in the conventional dishwasher, heat from the heater is transferred to wash water only when the heater contacts the wash water. As a result, foreign matter is attached to the surface of the heater, whereby the efficiency of heat exchange is reduced. Furthermore, the surface of the heater is prone to corrosion, which also reduces the durability of the heater.

On the other hand, a dishwasher using steam is classified as a dishwasher that generates steam using a heater provided in a sump or a dishwasher that generates steam using an additional steam generator.

The dishwasher that generates steam using the heater provided in the sump has the same problems as the dishwasher that generates hot water using the heater provided in the sump.

Meanwhile, in a case in which the steam generator includes a storage unit configured to store water and a heater provided in the storage unit to heat the water stored in the storage unit, the dishwasher that generates steam using the steam generator also has the same problems as the dishwasher that generates hot water using the heater provided in the sump.

DISCLOSURE OF INVENTION

Technical Problem

The present invention is directed to a pump and a dishwasher including the same that substantially obviate one or more problems due to limitations and disadvantages of the related art.

An object of the present invention is to provide a pump that is capable of simultaneously performing a function of heating wash water and a function of circulating wash water and a dishwasher including the same.

Another object of the present invention is to provide a pump configured to have a structure in which heat exchange between a heater and wash water is easily achieved and a dishwasher including the same.

Another object of the present invention is to provide a pump that is capable of preventing a heater from overheating even without controlling the level of wash water and a dishwasher including the same.

Another object of the present invention is to provide a pump that is capable of minimizing the amount of wash water that is to be supplied in order to generate hot water or steam and a dishwasher including the same.

Another object of the present invention is to provide a pump that is capable of preventing the efficiency of a heater that heats wash water from being reduced and preventing the durability of the heater from being reduced and a dishwasher including the same.

A further object of the present invention is to provide a pump including a detachable heater and a dishwasher including the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a pump includes a body, a partition wall configured to divide the interior of the body into two spaces, a first chamber located under the partition wall, the first chamber having an introduction portion, through which water is introduced, a second chamber located above the partition wall, the second chamber having a discharge portion, through which water is discharged, a communication hole formed through the partition wall to allow the first chamber and the second chamber to communicate with each other therethrough, an impeller provided in the second chamber to move water to the discharge portion, a housing configured to define the bottom surface of the first chamber, the housing being made of a conductor, a heater configured to heat the housing, and a steam discharge port formed through the first chamber to allow steam to be discharged therethrough.

The pump may further include a guide configured to divide the inner space of the first chamber into a first area, in which the steam discharge port is located, and a second area, in which the steam discharge port is not located, based on the water level in the first chamber.

The first area may have a larger volume than the second area.

The heater may be configured such that the amount of heat generated by a part of the heater configured to heat a liquid in the first area is greater than the amount of heat generated by a part of the heater configured to heat a liquid in the second area.

The heater may be configured such that the length of a part of the heater configured to heat a liquid in the first area is greater than the length of a part of the heater configured to heat a liquid in the second area.

The guide may protrude from the partition wall toward the housing such that the free end of the guide does not contact the housing.

The guide may include a base located in the first area to surround a part of the outer circumferential surface of the communication hole, a first plate connected between one end of the base and the inner circumferential surface of the first chamber to divide the first area and the second area from each other, and a second plate connected between the other end of the base and the inner circumferential surface of the first chamber to divide the first area and the second area from each other.

The introduction portion may be located in the first area.

The guide may include a first base located in the second area to surround a part of the outer circumferential surface of the communication hole, a first plate connected between one end of the first base and the inner circumferential surface of the first chamber to divide the first area and the second area from each other, and a second plate connected between the other end of the first base and the inner circumferential surface of the first chamber to divide the first area and the second area from each other.

The introduction portion may be located in the second area.

The housing may be detachably mounted to the body.

The pump may further include a valve provided in the steam discharge port to allow a fluid in the first chamber to be discharged to the outside and to prevent a fluid from being introduced into the first chamber.

The heater, the housing, the first chamber, and the second chamber may be sequentially stacked in a height direction of the body such that the heater, the housing, the first chamber, and the second chamber are arranged vertically.

In another aspect of the present invention, a dishwasher includes a tub configured to receive objects to be washed, a spray arm configured to spray wash water onto the objects to be washed, a steam supply unit configured to supply steam to the tub, a sump configured to store wash water, and a pump configured to supply the wash water stored in the sump to the spray arm, wherein the pump includes a body, a partition wall configured to divide the interior of the body into two spaces, a first chamber located under the partition wall, the first chamber having an introduction portion communicating with the sump, a second chamber located above the partition wall, the second chamber having a discharge portion communicating with the spray arm, a communication hole formed through the partition wall to allow the first chamber and the second chamber to communicate with each other therethrough, an impeller provided in the second chamber to move wash water to the discharge portion, a housing configured to define the bottom surface of the first chamber, the housing being made of a conductor, a heater configured to heat the housing, and a steam discharge port configured to allow the first chamber and the steam supply unit to communicate with each other therethrough.

The dishwasher may further include a guide configured to divide the inner space of the first chamber into a first area, in which the steam discharge port is located, and a second area, in which the steam discharge port is not located, based on the water level in the first chamber.

The first area may have a larger volume than the second area.

The heater may be configured such that the amount of heat generated by a part of the heater configured to heat a liquid in the first area is greater than the amount of heat generated by a part of the heater configured to heat a liquid in the second area.

The introduction portion may be located in the first area, and the guide may include a base located in the first area to surround a part of the outer circumferential surface of the communication hole, a first plate connected between one end of the base and the inner circumferential surface of the first chamber to divide the first area and the second area from each other, and a second plate connected between the other end of the base and the inner circumferential surface of the first chamber to divide the first area and the second area from each other.

The introduction portion may be located in the second area, and the guide may include a first base located in the second area to surround a part of the outer circumferential surface of the communication hole, a first plate connected between one end of the first base and the inner circumferential surface of the first chamber to divide the first area and the second area from each other, and a second plate connected between the other end of the first base and the inner circumferential surface of the first chamber to divide the first area and the second area from each other.

The dishwasher may further include a second base located in the first area to surround the outer circumferential surface of the communication hole and to connect one end of the first base to the other end of the first base, wherein the distance from the partition wall to a free end of the second base may be less than the distance from the partition wall to a free end of the first base.

The housing may be detachably mounted to the body.

The dishwasher may further include a valve provided in at least one of the steam discharge port and the steam supply unit to allow a fluid in the first chamber to be discharged to the outside and to prevent a fluid from being introduced into the first chamber.

The heater, the housing, the first chamber, and the second chamber may be sequentially stacked in a height direction of the pump such that the heater, the housing, the first chamber, and the second chamber are arranged vertically.

It is to be understood that both the foregoing general description and the following detailed description of the present invention are exemplary and explanatory and are intended to provide further explanation of the invention as claimed.

Advantageous Effects of Invention

The present invention has the effect of providing a pump that is capable of simultaneously performing a function of heating wash water and a function of circulating wash water and a dishwasher including the same.

In addition, the present invention has the effect of providing a pump configured to have a structure in which heat exchange between a heater and wash water is easily achieved and a dishwasher including the same.

In addition, the present invention has the effect of providing a pump that is capable of preventing a heater from overheating even without controlling the level of wash water and a dishwasher including the same.

In addition, the present invention has the effect of providing a pump that is capable of minimizing the amount of wash water that is to be supplied to generate hot water or steam and a dishwasher including the same.

In addition, the present invention has the effect of providing a pump that is capable of preventing the efficiency of a heater that heats wash water from being reduced and preventing the durability of the heater from being reduced and a dishwasher including the same.

In addition, the present invention has the effect of providing a pump including a detachable heater and a dishwasher including the same.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4 to 6 are views showing an example of a partition wall provided at the pump;

FIGS. 7 and 8 are views showing another embodiment of the partition wall; and

FIGS. 9 to 12 are views showing a pump and a dishwasher according to another embodiment of the present invention.

BEST MODE FOR CARRYING OUT THE INVENTION

Reference will now be made in detail to the preferred embodiments of the present invention, examples of which are illustrated in the accompanying drawings.

All terms disclosed in this specification correspond to general terms understood by persons having ordinary skill in the art to which the present invention pertains unless the terms are specially defined. If the terms disclosed in this specification conflict with general terms, the terms may be understood on the basis of their meanings as used in this specification.

It should be noted herein that the construction and control method of a device which will hereinafter be described are given only for illustrative purposes, and that the protection scope of the invention is not limited thereto. Wherever possible, the same reference numbers will be used throughout the drawings to refer to the same or like parts.

Figure 1:
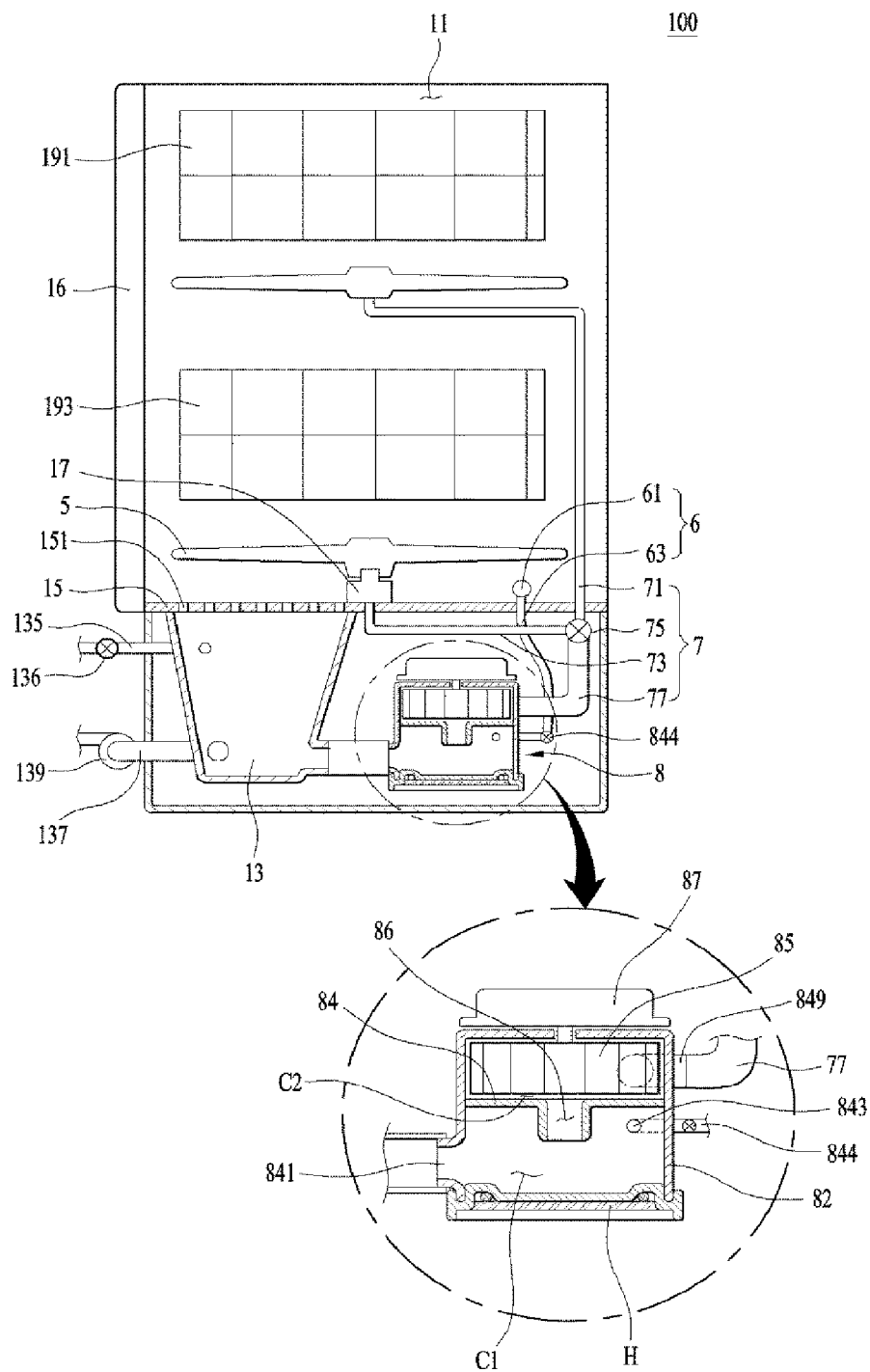
FIG. 1 is a view showing an example of a dishwasher according to the present invention.

The present invention relates to a pump 8 that is capable of simultaneously performing a function of moving wash water and a function of heating wash water and a device including the same. FIG. 1 is a view showing a case in which the pump 8 according to the present invention is included in a dishwasher by way of example.

The pump 8 according to the present invention may be included in various kinds of devices in addition to the dishwasher. Hereinafter, however, a case in which the pump 8 is included in a dishwasher 100 will be described for the convenience of description.

As shown in FIG. 1, the dishwasher 100 may include a cabinet 1, a tub 11 provided in the cabinet 1 to define a washing space, spray arms 3 and 5 configured to spray wash water to objects to be washed, and a pump 8 configured to supply wash water to the spray arms 3 and 5.

Racks, in which objects to be washed are received, may be provided in the tub 11. The racks may include an upper rack 191 provided in an upper area of the tub 11 and a lower rack 193 provided below the upper rack 191.

The tub 11 is opened and closed by a door 16 provided at one surface of the cabinet 1 such that a user opens the door 16 and withdraws the racks 191 and 193 from the tub 11.

In a case in which the racks include the upper rack 191 and the lower rack 193, the spray arms 3 and 5 may include an upper arm 3 configured to spray wash water to the upper rack 191 and a lower arm 5 configured to spray wash water to the lower rack 193.

Wash water sprayed to objects to be washed by the spray arms 3 and 5 (wash water left in the tub 11) may be collected in a sump 13.

The sump 13 is provided under the tub 11 to store wash water. The sump 13 may be partitioned from the tub 11 by a sump cover 15. In this case, the sump cover 15 may be provided with a collection hole 151, through which the interior of the tub 11 communicates with the interior of the sump 13.

Meanwhile, the sump 13 is connected to a water source (not shown) through a water supply channel 135. The water supply channel 135 may be opened and closed by a water supply valve 136, which is controlled by a controller (not shown).

The wash water stored in the sump 13 is discharged out of the dishwasher through a drainage channel 137 and a drainage pump 139.

The wash water stored in the sump 13 is supplied to the spray arms 3 and 5 through the pump 8 and a supply channel 7. The supply channel 7 may include a connection channel 77 connected to the pump 8, a first supply channel 71 connected between the connection channel 77 and the upper arm 3, and a second supply channel 73 connected between the connection channel 77 and the lower arm 5.

The upper arm 3 may be rotatably coupled to the first supply channel 71, and the lower arm 5 may be rotatably coupled to the second supply channel 73.

The first supply channel 71 and the second supply channel 73 diverge from the connection channel 77. In this case, a change-over valve 75, configured to open and close the first supply channel 71 and the second supply channel 73, may be provided at the point of the connection channel 77 from which the first supply channel 71 and the second supply channel 73 diverge.

The pump 8 may include a body 82 fixed in the cabinet 1, a partition wall 84 configured to partition the inner space of the body 82 into a first chamber C1 and a second chamber C2, a communication hole 86 formed through the partition wall 84 to allow the first chamber C1 and the second chamber C2 to communicate with each other therethrough, an introduction portion 841 connected between the sump 13 and the first chamber C1, a discharge portion 849 connected between the second chamber C2 and the connection channel 77, an impeller 85 provided in the second chamber C2, and a heater assembly H provided at the bottom surface of the first chamber C1.

Figure 2:
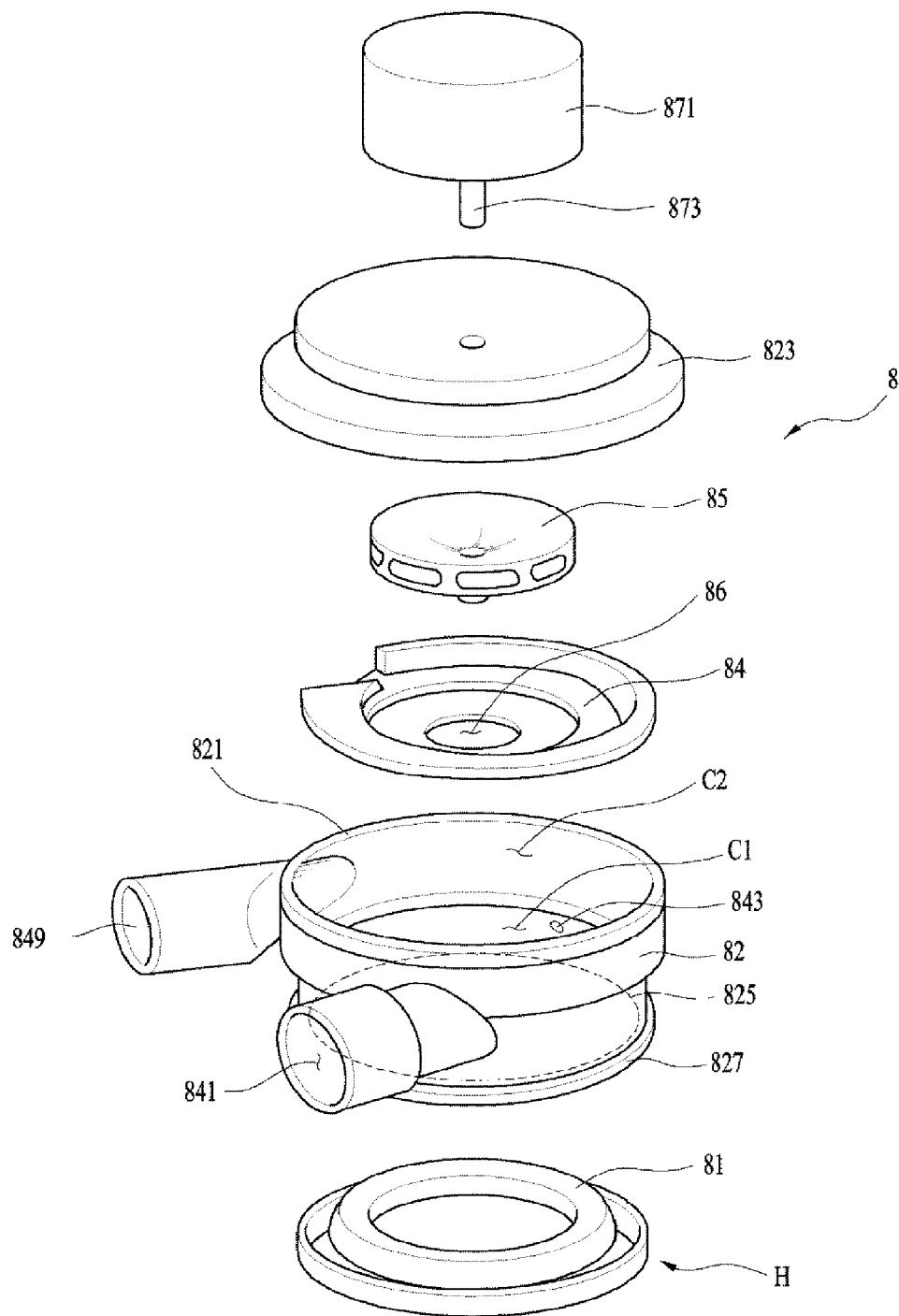
FIG. 2 is a view showing an example of a pump according to the present invention.

As shown in FIG. 2, the body 82 may be formed in a cylinder shape that is open at upper and lower surfaces thereof. A cover 823 is provided at an opening surface (the upper surface of the second chamber C2) 821 provided at the upper part of the body 82, and the heater assembly H is separately coupled to an opening surface (the bottom surface of the first chamber C1) 825 provided at the lower part of the body 82.

Since the heater assembly H forms the bottom surface of the first chamber C1, the pump 8 may simultaneously perform a function of heating wash water and a function of circulating wash water. In addition, since the heater assembly H is separately coupled to the body 82 from outside the pump 8, the heater assembly H may be easily assembled to or disassembled from the body 82 of the pump 8.

The impeller 85 moves wash water, introduced from the first chamber C1 into the second chamber C2 through the communication hole 86, to the discharge portion 949. The impeller 85 may be rotated by a drive unit 86 provided outside the body 82.

The drive unit 87 may include a motor 871 fixed to the cover 823. A rotary shaft 873 of the motor 871 may be fixed to the impeller 85 through the cover 823.

Figure 3:
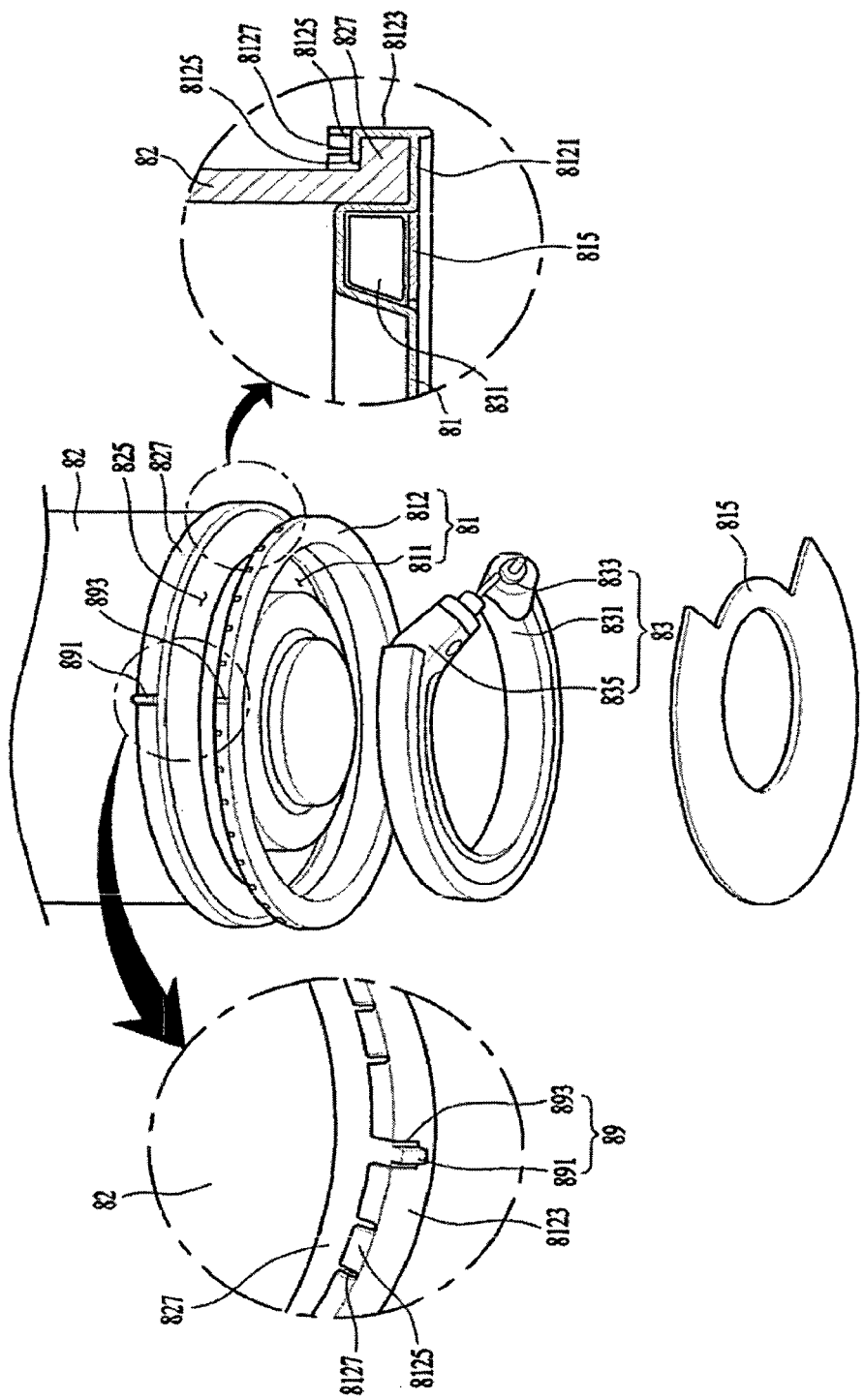
FIG. 3 is a view showing an example of a structure in which a body and a heater assembly are coupled to each other.

As shown in FIG. 3, the heater assembly H may include a housing 81 that defines the bottom surface of the first chamber C1, and a heater 83 provided outside the first chamber C1 to heat the housing 81. Consequently, the heater 83, the housing 81, the first chamber C1, and the second chamber C2 are sequentially stacked in a height direction of the body 82 such that the heater 83, the housing 81, the first chamber C1, and the second chamber C2 are arranged vertically.

The housing 81 may be made of a conductor, such as a metal, such that thermal energy generated by the heater 83 can be effectively supplied to wash water in the first chamber C1.

The housing 81 may include a receiving groove 811, in which the heater 83 is received such that the heater 83 is located outside the first chamber C1, and a fastening portion 812, through which the housing 81 is fixed to the body 82.

The receiving groove 811 may be formed in a shape that is capable of maximizing the surface area of the housing 81 that exchanges heat with wash water. FIG. 3 shows a case in which the receiving groove 811 protrudes toward the interior of the first chamber C1 by way of example.

The pump 8 may further include a heater cover 815 fixed to the housing 81, in order to prevent the heater 83, which is received in the receiving groove 811, from being exposed outside the receiving groove 811.

The heater cover 815 prevents wash water or foreign matter from being supplied to the heater 83, and also prevents components of the dishwasher disposed around the pump 8 from directly contacting the heater 83.

The fastening portion 812 may include a first extension portion 8121 extending from the edge of the receiving groove 811 in a direction in which the first extension portion 8121 becomes more distant from the receiving groove 811, and a second extension portion 8123 configured to couple the first extension portion 8121 to the lower opening surface 825.

The second extension portion 8123 may be formed by bending the first extension portion 8121. In this case, the first extension portion 8121 supports one end of the body 82 at which the lower opening surface 825 is provided, and the second extension portion 8123 may receive the circumferential surface of the body 82.

A support portion 827, which protrudes from the body 82, may be provided at the circumferential surface of the body 82. In this case, the fastening portion 812 may further include third extension portions 8125 configured to couple the second extension portion 8123 to the support portion 827.

The third extension portions 8125 may be provided at the free end of the second extension portion 8123 such that the third extension portions 8125 are spaced apart from each other by a predetermined distance 8127.

Since the housing 81 defines the bottom surface of the body 82 (the bottom surface of the first chamber C1) as described above, the wash water in the first chamber C1 may leak through the fastening portion 812. For this reason, it is necessary to prevent the wash water, discharged from the first chamber C1, from moving to the heater 83. To this end, a flange 817 may be further provided at the housing 81.

The flange 817 may be provided at any position on the housing 81 as long as the flange 817 can perform the above-mentioned function. FIG. 3 shows a case in which the flange 817 is provided at the first extension portion 8121 by way of example.

The flange 817, which is shown in FIG. 3, is characterized in that the flange 817 protrudes from the edge of the first extension portion 8121 toward the bottom surface of the cabinet 1 to surround the circumference of the receiving groove 811. Consequently, wash water left on the surface of the second extension portion 8123 moves through the flange 817 in direction in which the wash water becomes more distant from the heater 83. Even when the wash water in the first chamber C1 leaks through the fastening portion 812, therefore, the wash water is prevented from moving to the heater 83.

The heater 83 may include a heater body 831 configured to generate thermal energy when electric current is supplied to the heater body 831, and a first terminal 833 and a second terminal 835 configured to supply electric current to the heater body 831. The first terminal 833 and the second terminal 835 may be exposed outside the receiving groove 811, and the heater body 831 may be prevented from being exposed outside the receiving groove 811 by the heater cover 815.

Since the heater 83 is located outside the first chamber C1, the heater 83 does not contact wash water. Consequently, it is possible to prevent the efficiency of heat exchange between wash water and the heater from being reduced due to foreign matter attached to the surface of the heater 83 or to prevent the surface of the heater 83 from being corroded, thus preventing the durability of the heater 83 from being reduced.

A positioning portion 89 may be further provided at the pump 8 in order to easily couple the heater assembly H to the body 82. The positioning portion 89 may include a protrusion 891 provided at the support portion 827 of the body 82 and a protrusion receiving recess 893 provided in the second extension portion 8123 to receive the protrusion 891.

The protrusion 891 may extend in a height direction of the body 82, and the protrusion receiving recess 893 may have a width equal to the distance 8127 between one of the third extension portions 8125 and another of the third extension portions 8125.

However, in a case in which it is necessary to uniformly maintain a direction in which the heater assembly H is assembled (for example, in a case in which it is necessary for the two terminals 833 and 835 provided at the heater 83 not to be directed to the sump 13), the protrusion receiving recess 893 may have a width different from the distance 8127 between the third extension portions 8125. FIG. 3 is a view showing a case in which the width of the protrusion receiving recess 893 is greater than the distance 8127 between the third extension portions 8125 by way of example.

In the heater assembly H having the above-described structure, since the housing 81 forms the bottom surface of the first chamber C1, hot water (heated wash water) may be supplied to the spray arms 3 and 5 when the impeller 85 is rotated while the heater 83 is operated (electric current is supplied to the heater 83).

In this case, since the heater 83 heats the housing 82, which defines the bottom surface of the first chamber C1, it is possible to prevent the heater 83 from overheating even without controlling the water level in the first chamber C1 and to minimize the amount of wash water that is to be supplied to generate steam or hot water.

These effects may be maximized in a case in which the housing 81 of the heater assembly H forms a plane that is parallel to the bottom surface of the cabinet 1. That is, the above effects may be maximized in a case in which the housing 81 is fixed to the body 82 such that the housing 81 forms a horizontal plane.

Since the heater assembly H is provided at the bottom surface of the first chamber C1, the pump 8 may function as a steam generator in a case in which only the heater 83 is operated after a predetermined amount of wash water has been supplied to the first chamber C1.

In order for the pump 8 to perform a function of generating steam, however, it is necessary to further provide a steam discharge port 843 configured to discharge the steam generated in the first chamber C1 out of the first chamber C1.

As shown in FIG. 1, the steam discharge port 843 may communicate with the tub 11 through a steam supply unit 6. The steam supply unit 6 may include a nozzle 61 fixed to the tub 11 and a supply pipe 63 connected between the nozzle 61 and the steam discharge port 843. The steam discharge port 843 may be located at a position lower than the partition wall 84 and higher than the introduction portion 841.

Meanwhile, in a case in which the steam discharge port 843 is provided at the first chamber C1, a valve 844 configured to prevent external air from being introduced into the first chamber C1 may be further provided in at least one of the steam discharge port 843 and the supply pipe 63.

When external air is introduced into the first chamber C1 through the steam discharge port 843, the pressure of the wash water sprayed from the spray arms 3 and 5 may be lowered, or wash water may not be supplied to the spray arms 3 and 5. The reason for this is because, if the valve 844 is not provided in the steam discharge port 843, air may be introduced into the first chamber C1 when the impeller 85 is rotated.

The valve 844 may be configured to discharge a fluid in the first chamber C1 out of the first chamber C1 and to prevent an external fluid from being introduced into the first chamber C1. That is, the valve 844 may be a check valve that opens the steam discharge port 843 (or the steam supply unit 6) only when the pressure in the first chamber C1 is equal to or higher than a predetermined reference pressure.

In the pump 8 having the above-described structure, although the steam in the first chamber C1 may be supplied to the tub 11 through the supply pipe 63, the steam in the first chamber C1 may also be supplied to the tub through the spray arms 3 and 5 and the collection hole 151, which communicate with the first chamber C1.

The characteristic whereby the steam in the first chamber C1 is supplied to the tub through the spray arms 3 and 5, connected to the pump 8 via the steam supply unit 6 and the supply channel 7, and through the collection hole 151, connected to the pump 8 via the sump 13, may be advantageous in that steam is sprayed from a plurality of points and is therefore uniformly supplied into the tub 11. However, if a steam flow channel is too long, the steam may be condensed while flowing along the steam flow channel. As a result, the required amount of steam may not be supplied to the tub 11.

In order to solve the above-mentioned problem, it is necessary to design the pump 8 such that most of the steam in the first chamber C1 can be supplied to the tub 11 through the supply pipe 63. According to the present invention, the pump 8 may further include a guide 88 provided at the partition wall 84 such that most of the steam in the first chamber C1 can be supplied to the tub 11 through the supply pipe 63.

FIGS. 4 to 6 are views showing an example of the guide 88.

As shown in FIG. 4, the guide 88 protrudes from the partition wall 84 toward the housing 81 such that the free end of the guide 88 does not contact the housing 81.

The guide 88 divides the inner space of the first chamber C1 into a first area C11, in which the steam discharge port 843 is located, and a second area C13, in which the steam discharge port 843 is not located, based on the water level in the first chamber C1.

That is, when the water level in the first chamber C1 is higher than the free end of the guide 88, as shown in FIG. 5, the inner space of the first chamber C1 is divided into the first area C11 and the second area C13 by the guide 88.

The volume of the first area C1*l* may be greater than the volume of the second area C13, as shown in FIG. 6, such that the amount of steam that is discharged out of the first chamber C1 through the steam discharge port 843 is greater than the amount of steam that is discharged out of the first chamber C1 through the channel other than the steam discharge port 843.

In this case, the heater 83 may be fixed to the housing 81 such that the length of a part of the heater 83 located in the first area C11 is greater than the length of a part of the heater 83 located in the second area C13. That is, the heater 83 may be fixed in the receiving groove 811 such that the first terminal 833 and the second terminal 835 are located in a part of the second area C13 that projects into the housing 81.

Meanwhile, in a case in which the volume of the first area C11 and the volume of the second area C13 are set to be equal to each other, the heater 83 may be configured such that the amount of heat generated by a part of the heater 83 that is configured to heat wash water in the first area C11 is greater than the amount of heat generated by a part of the heater 83 that is configured to heat wash water in the second area C13.

A heater 8, which generates different amounts of heat based on the position thereof, may be variously configured. For example, the length of the heater 83 provided to heat wash water in the first area C11 may be greater than the length of the heater 83 provided to heat wash water in the second area C13.

In another example of the heater 83 generating different amounts of heat based on the position thereof, the sectional area of the heater 83 located under the first area C11 may be greater than the sectional area of the heater 83 located under the second area C13.

As shown in FIG. 6, the guide 88 may include a base 884 located in the first area C11 to surround a part of the outer circumferential surface of the communication hole 86, a first plate 881 connected between one end of the base 884 and the inner circumferential surface of the first chamber C1 to divide the first area C11 and the second area C13 from each other, and a second plate 883 connected between the other end of the base 884 and the inner circumferential surface of the first chamber C1 to divide the first area C11 and the second area C13 from each other.

In this case, the free end of the base 884, the free end of the first plate 881, and the free end of the second plate 883 may protrude from the partition wall 84 such that the free end of the base 884, the free end of the first plate 881, and the free end of the second plate 883 do not contact the housing 81. As a result, the guide 88 may divide the inner space of the first chamber C1 into the first area C11 and the second area C13 only when the water level in the first chamber C1 is higher than the free end of the guide 88. The first plate 881 and the second plate 883 may divide the inner space of the first chamber such that the volume of the first area C11 is greater than the volume of the second area C13.

When wash water is supplied into the first chamber C1, the guide 88 divides the inner space of the first chamber C1 into the first area C11 and the second area C13. When the heater 83 is operated in this state, steam is generated in both the first area C11 and the second area C13. Since the volume of the first area C11 is greater than the volume of the second area C13, however, most of the steam in the first chamber C1 is supplied to the tub 11 through the steam discharge port 843.

Meanwhile, the above-mentioned effects may be obtained in a case in which the amount of heat that the heater generates to heat the first area C11 is greater than the amount of heat that the heater generates to heat the second area C13 even though the volume of the first area C11 and the volume of the second area C13 are equal to each other.

The guide 88 is advantageous in that most of the steam in the first chamber C1 is supplied to the tub 11 through the steam discharge port 843. However, the channel resistance in the first area C11 may be greater than the channel resistance in the second area C13 due to the base 884 of the guide 88.

That is, the amount of wash water that moves to the communication hole 86 only through the second area C13 may be greater than the amount of wash water that moves to the communication hole 86 through the first area C11 due to imbalance in the channel resistance.

In a case in which the amount of wash water that moves to the communication hole 86 only through the second area C13 is greater than the amount of wash water that moves to the communication hole 86 through the first area C11, the wash water may not be heated rapidly. For this reason, the introduction portion 841 may be located in the first area C11 rather than in the second area C13.

Meanwhile, in a case in which it is not possible to locate the introduction portion 841 in the first area C11, the guide 88 may be designed as shown in FIG. 7.

The guide 88 of FIG. 7 is characterized in that the channel resistance in the first area C11 is less than the channel resistance in the second area C13 such that most of the wash water introduced into the first chamber C1 moves to the communication hole 86 through the first area C11.

That is, the guide 88 according to this embodiment may include a first base 885 located in the second area C13 to surround a part of the outer circumferential surface of the communication hole 86, a first plate 881 connected between one end of the first base 885 and the inner circumferential surface of the first chamber C1, and a second plate 883 connected between the other end of the first base 885 and the inner circumferential surface of the first chamber C1.

Referring to FIG. 8, the channel resistance in the second area C13 is greater than the channel resistance in the first area C11 since the guide 88 is configured to have a structure in which the first base 885 is located in the second area C13. As a result, most of the wash water introduced into the first chamber C1 moves to the communication hole 86 through the first area C11 even though the introduction portion 841 is provided in the second area C13. According to the present invention, therefore, it is possible to configure the pump such that heat exchange between the heater and wash water is easily achieved through the guide 88.

In addition, the first plate 881 may be provided with a first communication portion 881a, and the second plate 883 may be provided with a second communication portion 883a, such that the wash water introduced into the second area C13 can easily move to the first area C11.

The first communication portion 881a may be formed by bending the free end of the first plate 881 toward the partition wall 84 in a concave fashion, and the second communication portion 883a may be formed by bending the free end of the second plate 883 toward the partition wall 84 in a concave fashion. Consequently, the length from the partition wall 84 to the free end of the first communication portion 881a may be less than the length from the partition wall 84 to the free end of the first plate 881, and the length from the partition wall 84 to the free end of the second communication portion 883a may be less than the length from the partition wall 84 to the free end of the second plate 883.

Unlike what was described above, however, the first communication portion 881a and the second communication portion 883a may include a hole formed through the first plate 881 and a hole formed through the second plate 883, respectively.

Meanwhile, the guide 88 according to this embodiment may further include a second base 887 located in the first area C11 to connect one end of the first base 885 to the other end of the first base 885.

In this case, the second base 887 may be provided to surround the outer circumferential surface of the communication hole 86, and the distance L2 from the partition wall 84 to the free end of the second base 887 may be less than the distance L1 from the partition wall 84 to the free end of the first base 885.

FIGS. 9 and 10 are views showing another embodiment of the present invention. A dishwasher according to this embodiment includes a cabinet 1 that forms the external appearance of the dishwasher, racks 191 and 193 disposed in the cabinet 1 to receive dishes, spray arms 3, 31, and 5 disposed in the cabinet 1 to spray wash water to the dishes, a sump 13 disposed in the cabinet 1 to supply wash water to the spray arms 3, 31, and 5, a water supply channel 135 configured to supply wash water to the sump 13 or the spray arms 3, 31, and 5, a drainage channel 137 configured to discharge the wash water in the sump 13 out of the dishwasher, a filter 153 installed in the sump 13 to filter wash water, and a heater assembly H installed in the sump 13 to heat wash water.

A tub 11, which defines a washing space, is provided in the cabinet 1. The tub 11 is opened and closed by a door 16.

The racks 191 and 193 are installed in the tub 11. The racks 191 and 193 may include an upper rack 191 and a lower rack 193.

The spray arms 3, 31, and 5 spray wash water to the dishes. Wash water is supplied to the spray arms 3, 31, and 5 through supply channels.

In this embodiment, the spray arms 3, 31, and 5 include a lower arm 5 configured to spray wash water to the lower rack 193, an upper arm 3 located under the upper rack 191 to spray wash water to the upper rack 191, and a second upper arm 31 located above the upper rack 191 to spray wash water to the upper rack 191.

The supply channels may include a first supply channel 71 configured to supply wash water to the lower arm 5, a second supply channel 73 configured to supply wash water to the upper arm 3, and a third supply channel 78 configured to supply wash water to the second upper arm 31. The supply channels 71, 73, and 78 may be opened and closed by a change-over valve 75.

FIG. 9 shows a case in which wash water is supplied from the sump 13 to the spray arms 3, 31, and 5. Unlike the figure, wash water may be directly supplied to the spray arms 3, 31, and 5 through the water supply channel 135.

The water supply channel 135 is provided to supply wash water to the sump 13. In this embodiment, wash water is supplied to the sump 13 via the filter 153.

The drainage channel 137 is provided to discharge the wash water stored in the sump 13 out of the dishwasher. A drainage pump 139 is provided in the drainage channel 137.

The filter 153 filters foreign matter from the wash water. The filter 153 is disposed in a wash water flow channel through which wash water is introduced from the tub 11 to the sump 13.

To this end, a filter installation portion 131, at which the filter 153 is installed, may be formed at the sump 13. In this case, the filter installation portion 131 may be connected to the sump 13 via a filter channel 132.

The sump 13 includes a first chamber C1 configured to store wash water and a pump 8 configured to move the wash water stored in the first chamber C1 to the change-over valve 75 such that the wash water is supplied to the spray arms 3, 31, and 5.

The pump 8 includes a motor 871 and an impeller 85 configured to be rotated by the motor 871. During the rotation of the impeller 86, the wash water stored in the first chamber C1 is introduced into a second chamber C2, in which the impeller 86 is located, and is then supplied to the spray arms 3, 31, and 5 via a connection channel 77.

Meanwhile, the first chamber C1 communicates with the tub 11 through a supply pipe 63 and a nozzle 61. Consequently, steam generated by the heater assembly H is supplied to the tub 11 through the supply pipe 63 and the nozzle 61.

The steam generated in the first chamber C1 may be supplied to the tub 11 through the filter channel 132 and the filter installation portion 131 instead of the nozzle 61. That is, the sump 13 is connected to the tub 11 through the supply pipe 63 and the filter channel 132.

As shown in FIGS. 11 and 12, the heater assembly H includes a housing 81 installed outside the sump 13 to heat the wash water stored in the first chamber C1, a heater 83 located outside the sump 13 to heat the housing 81, and a temperature control module configured to control the electric power applied to the heater 83 based on the temperature of the heater 83.

The housing 81 is installed at the bottom surface of the sump 13 such that the housing 81 tightly contacts the bottom surface of the sump 13. The housing 81 transfers heat to the first chamber C1, which is disposed above the housing 81. The housing 81 may be variously formed based on the shape of the sump 13. For example, the housing 81 may have a large area in order to uniformly transfer heat to the entirety of the first chamber C1.

The housing 81 may be made of a material, such as aluminum or copper, which exhibits high thermal conductivity. The housing 81 may be provided with a receiving groove 811, in which the heater 83 is received.

The heater 83 may be formed in a ring shape, and the receiving groove 811 may be formed in a shape corresponding to the shape of the heater 83.

The temperature control module includes a temperature fuse 94 configured to regulate electric power based on the heat received from the heater 83 and a wire 95 connected between the temperature fuse 94 and the heater 83.

The temperature control module may further include a thermal bridge 96 and a heater cover 815 in order to easily install the temperature fuse 94. The thermal bridge 96 is disposed between the heater 83 and the temperature fuse 94 to transfer heat from the heater 83 to the temperature fuse 94.

The heater cover 815 is assembled to the housing 81 to minimize exposure of the heater 83, which is received in the receiving groove 811, to the outside.

In this embodiment, heat is transferred to the temperature fuse 94 through the thermal bridge 96. Alternatively, the temperature fuse 94 may directly contact the heater 83 such that heat from the heater 83 is directly transferred to the temperature fuse 94. In this embodiment, it is possible to easily replace the heater assembly H when the heater assembly H malfunctions since the heater assembly H is exposed outside the sump 13.

As is apparent from the above description, the present invention has the effect of providing a pump that is capable of simultaneously performing a function of heating wash water and a function of circulating wash water and a dishwasher including the same.

In addition, the present invention has the effect of providing a pump configured to have a structure in which heat exchange between a heater and wash water is easily achieved and a dishwasher including the same.

In addition, the present invention has the effect of providing a pump that is capable of preventing a heater from overheating even without controlling the level of wash water and a dishwasher including the same.

In addition, the present invention has the effect of providing a pump that is capable of minimizing the amount of wash water that is to be supplied to generate hot water or steam and a dishwasher including the same.

In addition, the present invention has the effect of providing a pump that is capable of preventing the efficiency of a heater that heats wash water from being reduced and preventing the durability of the heater from being reduced and a dishwasher including the same.

In addition, the present invention has the effect of providing a pump including a detachable heater and a dishwasher including the same.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

The invention claimed is:

1. A dishwasher comprising:
   a tub configured to receive objects to be washed;
   a spray arm configured to spray wash water to the objects to be washed;
   a sump configured to store wash water; and
   a pump configured to supply the wash water stored in the sump to the spray arm, wherein the pump comprises:

a body, the body having a opening at a bottom surface;
a partition wall configured to divide an interior of the body into a first chamber and a second chamber, the first chamber having an introduction portion communicating with the sump and the second chamber having a discharge portion communicating with the spray arm;
a communication hole formed through the partition wall to allow the first chamber and the second chamber to communicate with each other therethrough;
an impeller provided in the second chamber to move wash water to the discharge portion;
a housing configured to cover the opening of the body and to define a bottom surface of the first chamber, the housing being made of a conductor; and
a heater configured to heat the housing.

2. The pump according to claim 1, wherein the pump further comprises a receiving groove formed in the housing and protruding toward the interior of the first chamber,
wherein the heater is mounted inside the receiving groove such that the heater is located outside the first chamber.

3. The pump according to claim 2, wherein the housing is detachably mounted to the body.

4. The pump according to claim 2, wherein the pump further comprises a heater cover that covers the receiving groove to prevent the heater inside the receiving groove from being exposed.

5. The pump according to claim 2, wherein the pump further comprises a temperature control module to control electric power applied to the heater based on the temperature of the heater.

6. The pump according to claim 5, wherein the temperature control module comprises:
a temperature fuse configured to cut off electric power based on the temperature of the heater; and
a thermal bridge to transfer heat from the heater to the temperature fuse.

7. The pump according to claim 2, further comprising:
a support portion that protrudes from a circumferential surface of the body; and
a fastening portion provided in the housing to be coupled to the support portion.

8. The pump according to claim 7, further comprising:
a protrusion provided at the support portion; and
a protrusion receiving recess provided at the fastening portion to receive the protrusion.

9. A pump comprises:
a body having an opening at a bottom surface;
a partition wall configured to divide an interior of the body into a first chamber and a second chamber, the first chamber having an introduction portion through which water is introduced and the second chamber having a discharge portion through which water is discharged;
a communication hole formed through the partition wall to allow the first chamber and the second chamber to communicate with each other therethrough;
an impeller provided in the second chamber to move wash water to the discharge portion;
a housing configured to cover the opening of the body and to define a bottom surface of the first chamber, the housing being made of a conductor; and
a heater configured to heat the housing.

10. The pump according to claim 9, further comprising a receiving groove formed in the housing and protruding toward the interior of the first chamber, wherein the heater is mounted inside the receiving groove such that the heater is located outside the first chamber.

11. The pump according to claim 10, wherein the housing is detachably mounted to the body.

12. The pump according to claim 10, further comprising a heater cover that covers the receiving groove to prevent the heater inside the receiving groove from being exposed.

13. The pump according to claim 10, further comprising a temperature control module to control electric power applied to the heater based on the temperature of the heater.

14. The pump according to claim 13, wherein the temperature control module comprises:
a temperature fuse configured to cut off electric power based on the temperature of the heater; and
a thermal bridge to transfer heat from the heater to the temperature fuse.

* * * * *